US010913343B2

(12) United States Patent
Kimmig

(10) Patent No.: US 10,913,343 B2
(45) Date of Patent: Feb. 9, 2021

(54) HYBRID MODULE AND DRIVETRAIN

(71) Applicant: Schaeffler Technologies AG & Co. KG, Herzogenaurach (DE)

(72) Inventor: Karl-Ludwig Kimmig, Ottenhöfen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 16/329,834

(22) PCT Filed: Oct. 12, 2017

(86) PCT No.: PCT/DE2017/100861
§ 371 (c)(1),
(2) Date: Mar. 1, 2019

(87) PCT Pub. No.: WO2018/077332
PCT Pub. Date: May 3, 2018

(65) Prior Publication Data
US 2019/0232775 A1 Aug. 1, 2019

(30) Foreign Application Priority Data

Oct. 24, 2016 (DE) .................. 10 2016 220 790

(51) Int. Cl.
*B60K 6/387* (2007.10)
*B60K 6/40* (2007.10)
(Continued)

(52) U.S. Cl.
CPC ............. *B60K 6/387* (2013.01); *B60K 6/40* (2013.01); *B60K 6/48* (2013.01);
(Continued)

(58) Field of Classification Search
CPC .... B60K 6/20–547; B60K 6/387; B60K 6/40; F16H 57/0415–0417; H02K 9/02–06; F16D 21/06–08
See application file for complete search history.

(56) References Cited

U.S. PATENT DOCUMENTS 7,191,856 B2 * 3/2007 Morishita ................ B60K 6/26
180/65.21
7,508,100 B2 * 3/2009 Foster ..................... B60K 6/26
180/65.6
(Continued)

FOREIGN PATENT DOCUMENTS

DE          4311697 A1   10/1994
DE    102009030135 A1   12/2010
(Continued)

*Primary Examiner* — Ernesto A Suarez
*Assistant Examiner* — James J Taylor, III
(74) *Attorney, Agent, or Firm* — Kevin L. Parks

(57) ABSTRACT

A hybrid module for coupling an internal combustion engine in a motor vehicle includes an axis of rotation, an electric machine, a space, and a clutch. The electric machine has a rotor arranged on the axis of rotation. The space is surrounded by the rotor. The clutch is for transmitting a torque from a drive assembly. The clutch is arranged in the space surrounded by the rotor and includes a rotational part fixed to the rotor and arranged on the axis of rotation. The rotational part extends further radially from the axis of rotation than the rotor such that a heat introduced into the rotational part from the rotor or the clutch can be discharged.

19 Claims, 3 Drawing Sheets

(51) Int. Cl.
  *B60K 6/48*   (2007.10)
  *F16D 25/10*  (2006.01)
  *F16D 21/06*  (2006.01)

(52) U.S. Cl.
  CPC ...... *B60K 2006/4825* (2013.01); *F16D 25/10* (2013.01); *F16D 2021/0607* (2013.01)

(56) References Cited

U.S. PATENT DOCUMENTS

| | | | | |
|---|---|---|---|---|
| 8,425,376 | B2* | 4/2013 | Schoenek | B60K 6/405 |
| | | | | 180/65.22 |
| 8,453,817 | B2* | 6/2013 | Schrage | B60K 6/26 |
| | | | | 192/48.611 |
| 8,758,180 | B2* | 6/2014 | Frait | F16H 45/00 |
| | | | | 475/48 |
| 8,998,588 | B2* | 4/2015 | Bharadwaj | H02K 9/06 |
| | | | | 417/410.1 |
| 10,500,937 | B2* | 12/2019 | Thackwell | B60K 6/365 |
| 2015/0217632 | A1* | 8/2015 | Lebeau | F16D 23/14 |
| | | | | 192/110 B |
| 2017/0261045 | A1* | 9/2017 | Chamberlin | F16D 21/06 |

FOREIGN PATENT DOCUMENTS

| | | |
|---|---|---|
| DE | 102011117781 A1 | 5/2013 |
| DE | 102013006857 A | 10/2014 |
| DE | 102016207104 A1 | 11/2017 |

\* cited by examiner

HYBRID MODULE AND DRIVETRAIN

CROSS-REFERENCE TO RELATED APPLICATIONS

This application is the U.S. National Phase of PCT Appln. No. PCT/DE2017/100861 filed Oct. 12, 2017, which claims priority to German Application No. DE102016220790.3 filed Oct. 24, 2016, the entire disclosures of which are incorporated by reference herein.

TECHNICAL FIELD

The present disclosure relates to a hybrid module for a motor vehicle for coupling an internal combustion engine and to a drivetrain having a hybrid module according to the disclosure.

BACKGROUND

Known hybrid modules include an electric motor, a separating clutch, the actuating system thereof and bearings and housing components, which connect the three main components to form a functional unit. The electric motor allows electric driving, power in addition to that provided by operation of the internal combustion engine, and energy recovery. The separating clutch and the actuating system thereof ensure the coupling and decoupling of the internal combustion engine.

DE 10 2013 006 857 A1 discloses a hybrid module which has a triple clutch device. This triple clutch device includes a separating clutch for connecting the hybrid module to a drive assembly, e.g. to an internal combustion engine, and the two sub-clutches of a double clutch transmission. Moreover, the hybrid module includes an electric machine in the form of an electric motor having a rotor. The separating clutch of the hybrid module is arranged in the space surrounded by the rotor. Furthermore, one of the two sub-clutches is arranged, at least in one section, in this space surrounded by the rotor. Although the remaining region of this sub-clutch and the other sub-clutch are arranged outside the rotor space, they are positioned very close to the rotor of the electric machine. The clutches used are preferably embodied as wet clutches.

Furthermore, there are known hybrid modules in which the separating clutch is embodied as a dry clutch and is likewise arranged in the space surrounded by the rotor of the electric machine of the hybrid module.

The electric machine is designed for an optimum operating temperature range. If the temperature in the electric machine exceeds this optimum range, the upper limit of which is generally defined as 160° C., this leads to a reduction in the efficiency of the electric machine.

BRIEF SUMMARY

In the context of the present disclosure, the below-mentioned terms "radial", "axial" and "circumferential direction" always relate to the axis of rotation of the hybrid module.

The disclosure relates to a hybrid module for a motor vehicle for coupling an internal combustion engine, having an electric machine, which has a rotor arranged on an axis of rotation, and having at least one clutch for transmitting a torque from a drive assembly, which is arranged in the space surrounded by the rotor, and having a rotational part at least rotationally fixed to the rotor and likewise arranged on the axis of rotation. The rotational part extends further radially from the axis of rotation than the rotor, with the result that heat introduced into the rotational part from the rotor and/or the clutch can be discharged into the environment of the rotational part.

In this way, heat energy which arises at the friction surfaces of clutches is dissipated to the ambient air of the rotational part and, from there, to the hybrid module and transmission housing by means of convection.

The disclosure can be used both for dry clutches and for wet clutches, in a "P2" hybrid module, for example, wherein it develops an optimum effect, especially in dry clutches, by virtue of the effective heat dissipation. Therefore, it is possible to use dry clutches in the hybrid module and, consequently, the hybrid module has a high efficiency and low torque losses arise during the operation of a hybrid module according to the disclosure.

In the case of a rotationally symmetrical embodiment of the rotational part, the radially outer edge thereof should extend beyond the gap between the rotor and the stator of the electric machine. This ensures that the rotational part has a large area and a high peripheral speed at its radially outer side in order to store heat introduced into the rotational part by the electric machine and/or by the clutch and to transfer it to the environment of the rotational part and thus carry it to the outside of the hybrid module.

The axis of rotation is that of the electric machine and may also be that of the clutch arranged in the hybrid module. The space surrounded by the rotor is the space which is surrounded radially by the hollow-cylindrical inside of the rotor of the electric machine.

The rotational part can also be the clutch cover of the respective clutch or, alternatively, the outer clutch housing, which is connected firmly by mechanical means to the rotor of the electric machine, both rotationally and translationally. The rotational part may be likewise arranged at least in some region and, if appropriate, fully in the space surrounded by the rotor.

The rotational part can form a constituent part of the clutch. For example, the rotational part can serve as the counterpressure plate of at least one friction clutch arranged in the space surrounded by the rotor. Furthermore, the hybrid module can be designed in such a way that a plurality of clutches is arranged in the space surrounded by the rotor, and that the rotational part is a constituent part of a plurality of clutches.

Thus, for example, the first sub-clutch, referred to as K1, and the second sub-clutch, referred to as K2, of a double clutch device can be arranged in the space surrounded by the rotor, and/or K0, referred to as the separating clutch, can implement the torque transfer to the hybrid module. If appropriate, it is also possible for just two of these clutches to be arranged in the space surrounded by the rotor and for the third clutch to be arranged in a manner axially offset with respect to the rotor. If a double clutch is embodied in the manner required to actuate a double clutch transmission, for example, the rotational part can also serve as a counterpressure plate of both sub-clutches of the double clutch.

The rotor of the electric machine can be arranged on a rotor support. The rotational part connected to the rotor is a component connected firmly by mechanical means to the rotor support or is an integral constituent part of the rotor support.

The rotational part may be of rotationally symmetrical design, wherein the diameter Dt thereof bears the following relationship to the diameter of the rotor Dr: $Dt/Dr = 1.1$ to $2.0$. The large diameter of the rotational part ensures a high peripheral speed of its radially outer region, thus promoting the formation of turbulence in the air surrounding the rotational part, further increasing the effectiveness of heat dissipation.

For the purpose of efficient heat dissipation, provision is furthermore made for the rotational part to have a plurality of component segments arranged axially adjacent to one another on the radially outer side of said rotational part. That is to say that, for example, the wall of that region of the rotational part which is passed out of the rotor is bent over at the radially outer edge of the rotational part, with the result that there is twice or several times the amount of the material of the rotational part here, parallel to the axis of rotation. At the same time, the disclosure is not restricted to such a bent configuration of the rotational part. On the contrary, the component segments can also be positioned adjacent to one another in such a way that at least one annular segment is additionally secured on a rotational part segment which is of substantially flat configuration and which is passed out of the rotor space. By means of this additional folded mass provided by bending, the rotational part is given an additionally enlarged surface which increases the effectiveness of heat dissipation.

The radially outer edge of the rotational part should nevertheless be configured in such a way that air in the housing of the hybrid module, referred to as bell air, can flow around it at a high speed. The air should preferably flow radially outward by virtue of the centrifugal force (similar to a radial fan) and, by virtue of the rotary motion, should additionally flow around the surface of the rotational part in the circumferential direction, likewise at a high speed.

Between the component segments there may be a spacing which is at least 1/10 of the thickness of the wall of the thinnest of the adjacent component segments. In this case, the component segments can be connected to one another by webs arranged radially on the outside, where the webs cover no more than 1/5 and, in an example embodiment, no more than 1/10 of the circumference of the rotational part in total in order to allow heated air contained between the component segments to emerge radially for the sake of further heat dissipation.

In another embodiment, provision is made for the rotational part to have, at least in the radially outer region thereof, shaped elements which promote the formation of an air flow with at least a radial component when the rotational part rotates. This means that the outer region of the rotational part has an appropriate geometry which increases the speed of flow of the bell air. Such a geometry can be configured in a manner similar to blades of a radial fan, for example.

For the purpose of passing the rotational part out of the space surrounded by the rotor, provision may be made for the rotational part to have a radially inner region, a radially outer region and a region offset between the radially inner region and the radially outer region. The radially inner region may be arranged in the space surrounded by the rotor, and the radially outer region may extend in a manner offset along the axial direction on one side of the rotor. At the same time, the disclosure does not intend to exclude the possibility of arranging further components of the hybrid module between the radially outer region and the rotor.

In another embodiment of the disclosure, a drivetrain for a motor vehicle having an internal combustion engine and a hybrid module according to the disclosure is made available, said drivetrain also having a drive transmission. The hybrid module is connected to the internal combustion engine by clutches and mechanically to the drive transmission.

The drivetrain is designed to transfer a torque supplied by a drive assembly, e.g. an energy conversion machine, an internal combustion engine or an electric drive machine, for example, and output via the output shaft thereof in such a way that it can be connected up and disconnected for at least one consuming unit. A consuming unit is a driven wheel of a motor vehicle or an electric generator for supplying electric energy, for example. It is also possible to implement absorption of inertial energy introduced by a driven wheel, for example. The driven wheel then forms the drive assembly, wherein the inertial energy thereof can be transferred by means of the friction clutch to an electric generator for energy recovery, i.e. for electric storage of the braking energy, in a correspondingly designed drivetrain.

BRIEF DESCRIPTION OF THE DRAWINGS

The disclosure described above is explained in detail below in relation to the relevant technical background, with reference to the associated drawings, which show example embodiments. The disclosure is not in any way restricted by the purely schematic drawings, and it should be noted that the illustrative embodiments shown in the drawings are not restricted to the dimensions illustrated. In the drawings.

DETAILED DESCRIPTION

Figure 1:
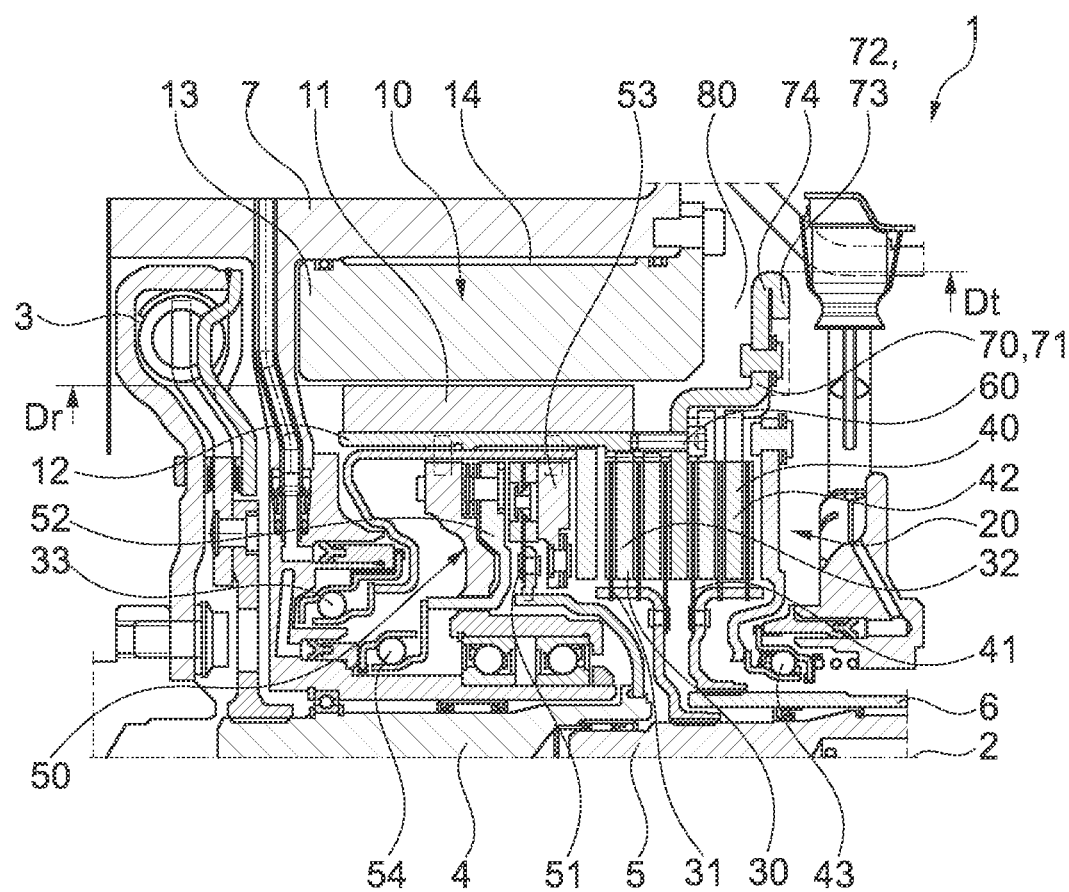
FIG. 1 shows a first embodiment of a hybrid module according to the disclosure in a sectional view.
Figure 3:
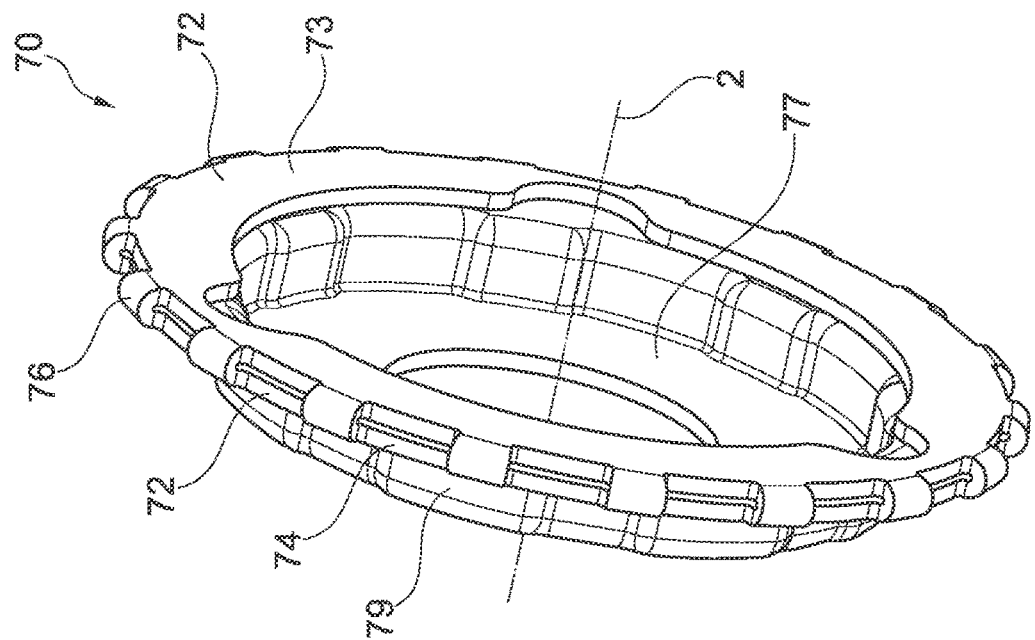
FIG. 3 shows the rotational part of the hybrid module according to the disclosure in a perspective view.
Figure 2:
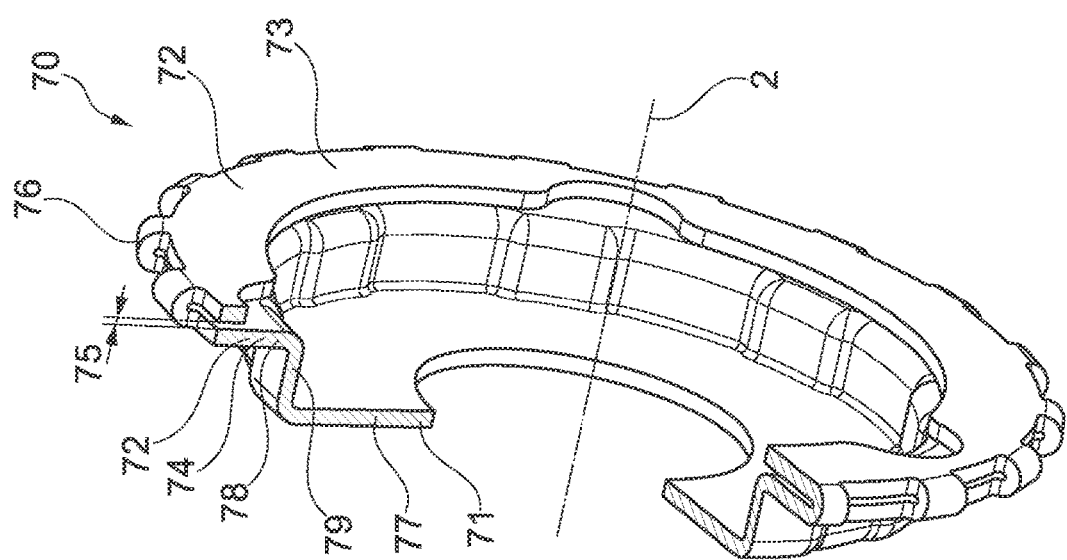
FIG. 2 shows a rotational part of the hybrid module according to the disclosure in a partially sectioned perspective view.
Figure 4:
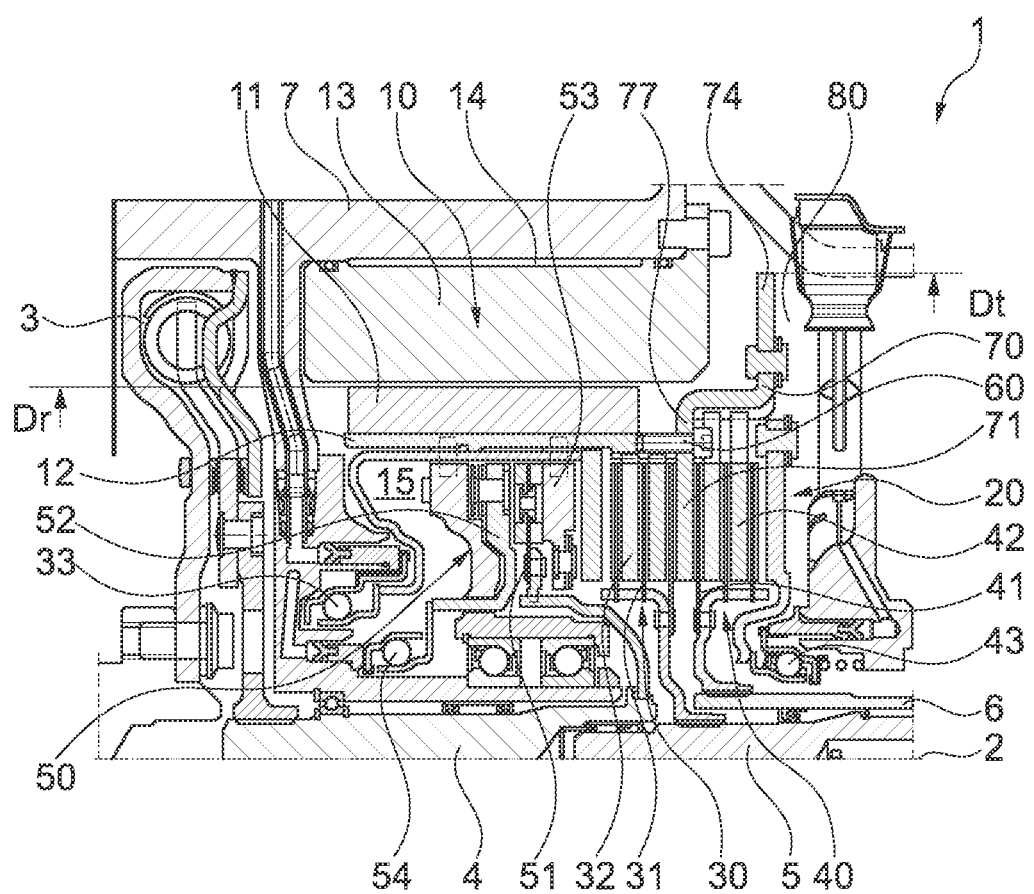
FIG. 4 shows a second embodiment of the hybrid module according to the disclosure in a sectional view.

FIGS. 1 and 4 show two different embodiments of the rotational part and, accordingly, also of the overall hybrid module according to the disclosure, and FIGS. 2 and 3 show the same rotational part in a different view.

First of all, the general structure of the hybrid module according to the disclosure will be explained with reference to FIG. 1. The hybrid module 1 has an axis of rotation 2, on which, in the embodiment illustrated here, a dual mass oscillator 3, a drive shaft 4 for the connection of a drive assembly (not illustrated here), e.g. an internal combustion engine, a first output shaft 5 of a double clutch transmission and a second output shaft 6 of the double clutch transmission are jointly arranged. An electric machine 10, the rotor 11 of which rotates around the axis of rotation 2 in a stator 13, is likewise arranged on the axis of rotation 2. In this case, the rotor 11 is arranged on a rotor support 12.

The hybrid module 1 furthermore includes a first clutch 30, which is mechanically coupled to the first output shaft 5, and a second clutch 40, which is coupled to the second output shaft 6. In this arrangement, the first clutch 30 and the second clutch 40 form a clutch unit 20 of the double clutch transmission (not illustrated here). The clutches arranged here, at least the first clutch 30 and the second clutch 40, may be embodied as dry clutches.

Moreover, the hybrid module 1 includes a separating clutch 50, by which the drive shaft 4 can be mechanically connected to the rotor 11 via the rotor support 12. To actuate the sub-clutches, the first clutch 30 is assigned a first actuating system 33 and the second clutch 40 is assigned a second actuating system 43. The separating clutch 50 is assigned a separating clutch actuating system 54. By the actuating systems 33, 43, 54, the respective clutches 30, 40, 50 can be opened and closed and, in this way, torques can be transmitted.

Actuation of the separating clutch actuating system 54 causes the pressure plate 52 of the separating clutch 50 to be moved axially, thus enabling it to fix a clutch disk 51 between itself and the counterpressure plate 53 of the separating clutch 50 by frictional engagement and, in this way, enabling it to transmit torque from the drive shaft 4 to the rotor support 12, which is connected to the clutch disk 51 of the separating clutch 50. Depending on the actuation of the first clutch 30 or of the second clutch 40 by means of the first actuating system 33 or of the second actuating system 43, the respective pressure plate, namely the first pressure plate 32 or the second pressure plate 42, is moved axially in such a way that the first clutch disk 31 or the second clutch disk 41 is fixed between the respective pressure plate 32, 42 and a counterpressure plate 71 by frictional engagement. This enables torque to be transmitted from the rotor support 12 connected in a fixed manner to the counterpressure plate 71, via the respective clutch disk, namely via the first clutch disk 31 or via the second clutch disk 41, to the first output shaft 5 or the second output shaft 6.

The counterpressure plate 71, which is used for the first clutch 30 and also for the second clutch 40, is here embodied as a rotational part 70, which extends radially outward axially adjacent to the rotor 11 and also adjacent to the stator 13 of the electric machine 10. This rotational part 70 is connected in a fixed manner to the rotor support 12 by a fasteners 60, in this case by the screw illustrated. By means of the rotor 11 of the electric machine 10, it is thus possible in a simple manner, by heat conduction, for heat from the electric machine 10 to be introduced via the rotor support 12 into the rotational part 70 and, from there, dissipated to the environment of the rotational part, in this case the "bell air" 80. By convection, the heat of this bell air 80 can be discharged to the surrounding housing 7, only partially illustrated here, and, from there, to the ambient air of the hybrid module 1.

It is apparent that the separating clutch 50 is arranged fully in the space 15 surrounded by the rotor 11, and the first clutch 30 is arranged partially therein. In this case, this space 15 surrounded by the rotor is an ideal cylinder, which is formed by the inside of the rotor 11 as it rotates.

It is clearly apparent that the diameter Dr of the rotor 11 is smaller than the diameter Dt of the rotational part 70. This ensures that the area of the rotational part 70 is large and hence that a large area is available for heat dissipation to the environment. Moreover, the radially outer region of the rotational part 70 has a higher peripheral speed than the rotor 11 itself, and therefore, efficient heat dissipation to the environment is ensured, especially since the high speed causes the formation of turbulence in the bell air 80, which promotes heat dissipation.

It is furthermore apparent that the rotational part 70 has a plurality of component segments 72 arranged axially adjacent to one another. In this respect, attention is drawn to FIGS. 2 and 3. From FIGS. 2 and 3, it is apparent that these component segments 72 are arranged parallel to one another in the radial direction. There is a spacing 75 or gap between them which promotes the dissipation of heat from the component segments 72 and thus increases the surface area of the rotational part 70 overall. Thus, the rotational part 70 includes an annular segment 73, which is connected by webs 76 to a flat segment 74 formed at least in the radially outer region of the rotational part 70.

Here, a web 76 of this kind is of such narrow design that air present in the region of the spacing 75 between the component segments 72 can escape radially from the region between the annular segment 73 and the flat segment 74 by virtue of the rotation of the rotational part 70 and the centrifugal force acting on the air during this process. To achieve the discharge of the heat from the electric machine and/or the clutches from the space 15 surrounded by the rotor 11 or to transmit the heat from the electric machine 10 by heat conduction, the rotational part has a radially inner region 77, which also serves as the counterpressure plate 71. Adjoining this radially inner region 77 is an offset region 79, from which, in turn, the radially outer region 78 extends radially outward. This radially outer region 78 forms the flat segment 74 of the rotational part 70, to which the annular segment 73 extending parallel thereto is connected in the manner described via the webs 76.

FIG. 4 illustrates an embodiment of the hybrid module according to the disclosure which is similar to that shown in FIG. 1. In the embodiment shown in FIG. 4, the difference with respect to the embodiment illustrated in FIG. 1 consists in the fact that the rotational part 70 has just one flat segment 74 as a radially outer region 78 and has no mass arranged parallel thereto, as illustrated in FIG. 1.

Common to both embodiments illustrated in FIGS. 1 and 4 is the fact that the diameter Dt of the rotational part 70 is greater than the diameter Dr of the rotor 11. In other words, the radially outer region 78 of the rotational part 70 extends further out radially in relation to the axis of rotation 2 than the distance from the axis of rotation 2 of the gap 14 between the stator 13 and the rotor 11 of the electric machine 10.

The hybrid module proposed here provides a compact unit having a plurality of integrated clutches, embodied as dry clutches, for example, which can be produced at low cost and has low torque losses.

REFERENCE NUMERALS 1 hybrid module
2 axis of rotation
3 dual mass oscillator
4 drive shaft
5 first output shaft
6 second output shaft
7 housing
10 electric machine
11 rotor
12 rotor support
Dr diameter of the rotor
13 stator
14 gap
15 space surrounded by the rotor
20 clutch unit
30 first clutch
31 first clutch disk
32 first pressure plate
33 first actuating system
40 second clutch
41 second clutch disk
42 second pressure plate
43 second actuating system
50 separating clutch
51 clutch disk of the separating clutch
52 pressure plate of the separating clutch
53 counterpressure plate of the separating clutch
54 separating clutch actuating system
60 fastening means 70 rotational part
71 counterpressure plate
Dt diameter of the rotational part
72 component segment
73 annular segment
74 flat segment
75 spacing
76 web
77 radially inner region
78 radially outer region
79 offset region
80 bell air

The invention claimed is:

1. A hybrid module for coupling an internal combustion engine in a motor vehicle, comprising:
an axis of rotation;
an electric machine including a rotor arranged on the axis of rotation;
a space surrounded by the rotor;
an actuating clutch:
for selectively transmitting a torque from the internal combustion engine to the rotor; and
arranged in the space surrounded by the rotor; and,
a first friction clutch at least partially arranged in the space surrounded by the rotor; and
a rotational part fixed to the rotor and arranged on the axis of rotation, wherein:
the rotational part extends further radially from the axis of rotation than the rotor such that a heat introduced into the rotational part from the rotor or the first friction clutch can be discharged; and
the rotational part includes:
a radially outer side;
a plurality of planar component segments arranged axially adjacent to one another on the radially outer side; and
a radially outer region with shaped elements radially outside of and connecting the plurality of planar component segments.

2. The hybrid module of claim 1, wherein the rotational part is at least partially arranged in the space surrounded by the rotor.

3. The hybrid module of claim 1, wherein the rotational part is a counterpressure plate for the first friction clutch.

4. The hybrid module of claim 1 further comprising a second friction clutch, wherein the rotational part is a constituent part of the first friction clutch and the second friction clutch.

5. The hybrid module of claim 1, wherein:
the rotor is arranged on a rotor support; and,
the rotational part is connected firmly by mechanical means to the rotor support or is an integral constituent part of the rotor support.

6. The hybrid module of claim 1, wherein the rotational part is rotationally symmetric with a diameter Dt having the following relationship to a diameter Dr of the rotor: Dt/Dr=1.1 to 2.0.

7. The hybrid module of claim 1, wherein the shaped elements are arranged to promote an air flow with a radial component when the rotational part is rotated.

8. The hybrid module of claim 1, wherein:
the rotational part includes a radially inner region and a region offset between the radially inner region and the radially outer region;
the radially inner region is arranged in the space surrounded by the rotor; and,
the radially outer region is axially offset on one side of the rotor.

9. A drivetrain for a motor vehicle comprising:
the internal combustion engine;
a drive transmission; and
the hybrid module of claim 1 mechanically connected to the drive transmission.

10. A hybrid module for a motor vehicle for coupling an internal combustion engine, comprising:
an axis of rotation;
an electrical machine comprising:
a rotor arranged on the axis of rotation; and
a space enclosed by the rotor;
a rotary part rotationally connected to the rotor and arranged on the axis of rotation, wherein:
the rotary part extends further radially from the axis of rotation than the rotor so that heat introduced into the rotary part by the rotor can be dissipated into the surroundings of the rotary part;
the rotary part comprises a plurality of planar component segments:
arranged axially next to one another with a continuous gap therebetween that is radially delimited by an outer circumferential surface of the plurality of component segments; and
arranged in parallel with one another in a radial extension with a distance between the component segments that improves heat dissipation from the component segments and enlarges a surface of the rotary part.

11. The hybrid module of claim 10 further comprising a clutch for transmitting torque from the internal combustion engine arranged in the space enclosed by the rotor.

12. The hybrid module of claim 10, wherein the rotary part is at least partially arranged in the space enclosed by the rotor.

13. The hybrid module of claim 10 wherein the rotary part forms a counterpressure plate of a friction clutch at least partially arranged in the space enclosed by the rotor.

14. The hybrid module of claim 10 further comprising two clutches at least partially arranged in the space enclosed by the rotor, wherein the rotary part is a part of at least one of the two clutches.

15. The hybrid module of claim 10, wherein the rotor of the electrical machine is arranged on a rotor carrier and the rotary part is a component fixed to the rotor carrier or integrally formed from a same piece of material as the rotor carrier.

16. The hybrid module of claim 10, wherein:
the rotary part is rotationally symmetrical; and
a diameter Dt of the rotary part is related to a diameter Dr of the rotor in the following ratio: Dt/Dr=1.1 to 2.0.

17. The hybrid module of claim 10, wherein the rotary part comprises shaped elements in a radially outer region that promote a radial air flow upon rotation of the rotary part.

18. The hybrid module of claim 10 wherein the rotary part comprises:
a radially inner region;
a radially outer region; and
a region disposed between the radially inner region and the radially outer region, wherein:
the radially inner region is arranged in the space enclosed by the rotor; and
the radially outer region extends on an axial side of the rotor axially offset from the radially inner region.

19. A drivetrain for a motor vehicle comprising:
an internal combustion engine;

a drive transmission; and the hybrid module of claim 10 mechanically connected to the internal combustion engine and to the drive transmission by at least one clutch.

\* \* \* \* \*